Dec. 22, 1936.  H. J. FERRIS  2,065,063
MILK STRAINER AND COVER
Filed Jan. 6, 1936  2 Sheets-Sheet 1
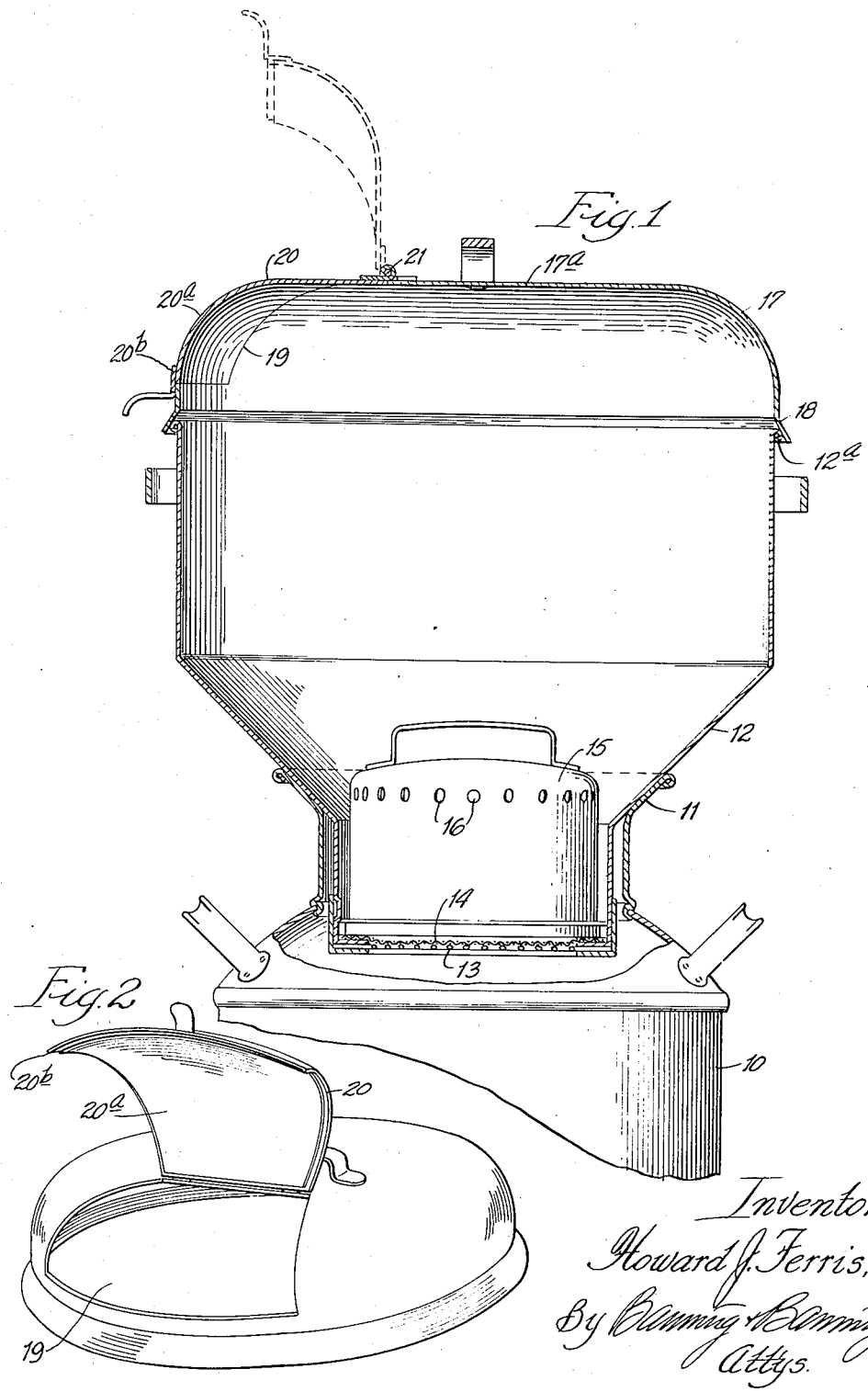

Dec. 22, 1936.   H. J. FERRIS   2,065,063
MILK STRAINER AND COVER
Filed Jan. 6, 1936   2 Sheets-Sheet 2
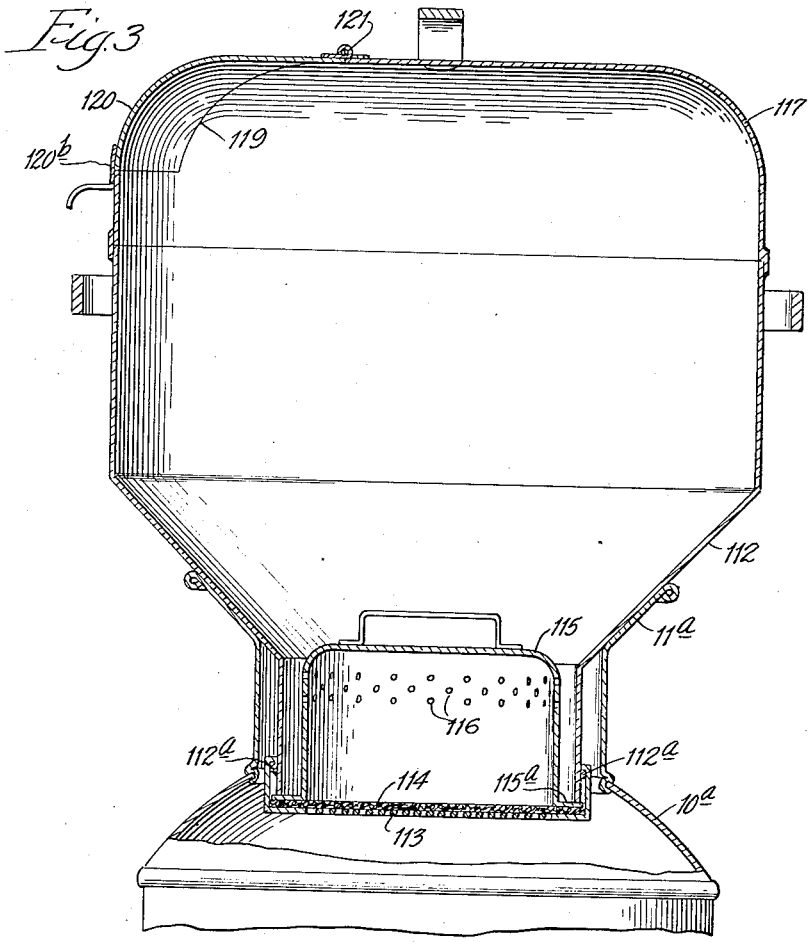
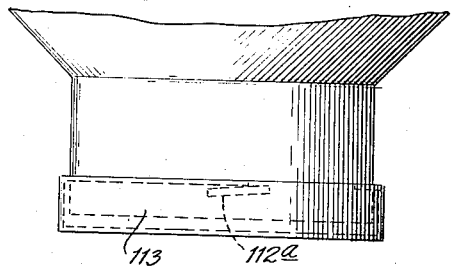
Inventor:
Howard J. Ferris,
By Channing & Channing
Attys.

Patented Dec. 22, 1936

2,065,063

UNITED STATES PATENT OFFICE 2,065,063

MILK STRAINER AND COVER

Howard J. Ferris, Harvard, Ill., assignor to Starline Inc., Harvard, Ill., a corporation of Illinois Application January 6, 1936, Serial No. 57,755

4 Claims. (Cl. 210—157)

An object of this invention is to provide a means for preventinng contamination of the milk during the time it is passing through the strainer and into the can. This contamination is brought about particularly by flies and germ-laden dust, and great care is required to keep them from reaching the milk in any way.

Another object is to provide apparatus for accomplishing this purpose which is simple and which readily lends itself to sterilization.

These and other objects, as will hereinafter appear, are fully described in the following specification and shown in the accompanying drawings, in which—

Figure 1 is a side elevation, partly in section, of a milk can with a strainer therein and my cover in place on the strainer;

Fig. 2 is a perspective view of the cover having a lid in raised position;

Fig. 3 is a view similar to Fig. 1 but showing a modified form of the strainer; and Fig. 4 is a partial side elevation of the lower portion of the same.

The embodiment illustrated is shown in Figs. 1 and 2 in connection with a milk can 10 of a well known design having an outwardly flared top 11, in which is placed a strainer 12 also of a well known design. This strainer has a grill 13 with suitable openings therein, and over this is placed a strainer disk 14 of cotton felt or the like, which is firmly held around its edges by means of the end of a cylindrical bell 15 which has a series of opening 16 through which milk reaches the felt disk. This strainer per se forms no part of the present invention and is used for illustration only.

The top of this strainer is cylindrical in form and has a rolled edge 12$^a$. My cover 17 is convex preferably having a flat top 17$^a$ and terminating in a depending outwardly extending flange 18, which is adapted to rest upon the top of the strainer and to fit the same very closely so as to prevent flies and dust from entering the top of the strainer. The cover has an opening 19 which is normally closed by means of a tight fitting lid 20 which is hingedly connected at 21 to the top of the cover. This lid is preferably formed of a segment which is stamped from the cover 17 so as to form the opening 19, together with an overlapping flange 20$^b$ which is preferably soldered to the top of the segment, so that when the lid is closed the segment fills the opening 19 previously occupied by it, and the overlapping flange 20$^b$ contacts the surrounding metal, thereby completely closing the opening. When in use, the lid 20 is normally closed and the operator lifts the lid, pours a bucket of milk into the strainer and immediately closes the lid, so that no flies are permitted to enter and dust and is very largely excluded.

In Figs. 3 and 4 is shown a modified form of strainer 112 having an integral top 117 with a single opening 119 which may be closed by a tight fitting lid 120 hinged at 121. The strainer 112 has a grill-like bottom 113 which is readily removable as by turning it on inclined projections or interrupted threads 112$^a$ on the sides of the reduced lower portion of the strainer. A strainer disk 114 of cotton felt or the like overlies the bottom 113 and is clamped thereon by a flanged bottom 115$^a$ of a cylindrical bell 115. This bell has a series of holes 116 arranged around its upper portion through which milk may pass to the strainer disk. The flanged bottom 115$^a$ is pressed down by the bottom of the strainer 112. The strainers 12 and 112 are preferably large enough to hold a pail of milk so that it is rapidly filled at one operation, after which the lid is promptly closed and the milk permitted to pass through before another pair is poured in. Each of the forms of the strainer shown is simple and readily separable into elements which can be thoroughly cleaned and sterilized.

In this way the chance of the milk becoming contaminated between the time it is poured from a pail into the strainer and its entry into the milk can is greatly lessened.

I claim:

1. In apparatus of the class described, a milk can, a strainer of a size sufficient to hold a pail of milk and having a rim and having a lower portion shaped to conform to and closely fit within the top of the milk can, a cover for the strainer adapted to closely fit the rim of the strainer and having an opening therein of such circumferential and radial extent as to receive and support the rim of a milk pail on the circumferential wall thereof and provide a space inwardly thereof through which milk can be poured, and a lid movable to cover or uncover the opening, whereby the only communication between the outside atmosphere and interior of the strainer and can supporting the same in use, is through said opening.

2. In apparatus of the class described, a milk can, a strainer having a rim and having a lower portion shaped to conform to and closely fitting the top of the milk can, a cover for the strainer adapted to closely fit the rim of the strainer and having an opening therein through which milk can be poured, and a lid movable to cover or uncover the opening, the cover having a convex portion and the opening therein being defined by walls which extend parallel to the rim of the strainer and radially therefrom in the convex portion, whereby the only communication between the outside atmosphere and interior of the strainer and can supporting the same is through said opening.

3. In apparatus of the class described, a milk can, a strainer having a rim and having a lower portion closely fitting the top of the milk can, a cover for the strainer adapted to closely fit the rim of the strainer and having an opening therein through which milk can be poured, the said opening in the cover being defined by walls which extend both circumferentially and radially of the cover and a lid movable to cover or uncover the opening, the lid having a portion accurately fitting within the opening and having an offset edge flange engaging the outer surface of the cover surrounding the opening and limiting its movement through said opening.

4. In apparatus of the class described, a strainer of a size sufficient to hold a pail of milk and adapted to fit the top of a milk can and to rest thereon, the strainer having its top closed except for an opening having walls extending circumferentially of the strainer to provide a supporting edge for a pail and radially therefrom to provide a space through which milk can be poured, and a lid hinged to the cover adjacent the inner radial wall of the opening so as to be elevated above the open end of the pail in the act of pouring milk through said opening.

HOWARD J. FERRIS.